(12) United States Patent
Mosley et al.

(10) Patent No.: US 9,885,285 B2
(45) Date of Patent: Feb. 6, 2018

(54) GAS TURBINE ENGINE NACELLE

(71) Applicant: ROLLS-ROYCE PLC, London (GB)

(72) Inventors: Christopher Alan Mosley, Derby (GB); Angus Roy Smith, Derby (GB); Christopher Thomas John Sheaf, Derby (GB); John Richard Wells, Derby (GB)

(73) Assignee: ROLLS-ROYCE plc, London (GB)

( * ) Notice: Subject to any disclaimer, the term of this patent is extended or adjusted under 35 U.S.C. 154(b) by 305 days.

(21) Appl. No.: 14/857,083

(22) Filed: Sep. 17, 2015

(65) Prior Publication Data

US 2016/0108811 A1    Apr. 21, 2016

(30) Foreign Application Priority Data

Oct. 16, 2014 (GB) .................................. 1418322.2

(51) Int. Cl.
F02C 7/04 (2006.01)
F02K 3/06 (2006.01)

(52) U.S. Cl.
CPC .................. F02C 7/04 (2013.01); F02K 3/06 (2013.01); F05D 2250/232 (2013.01)

(58) Field of Classification Search
CPC ......... F02C 7/04; F02K 3/06; F05D 2250/232
See application file for complete search history.

(56) References Cited

U.S. PATENT DOCUMENTS

| | | | | |
|---|---|---|---|---|
| 3,765,623 A * | 10/1973 | Donelson | ............... | B64D 33/02 137/15.1 |
| 4,192,336 A | 3/1980 | Farquhar et al. | | |
| 4,220,171 A * | 9/1980 | Ruehr | .................... | B64D 33/02 137/15.1 |
| 4,722,357 A * | 2/1988 | Wynosky | ............... | B64D 33/02 137/15.1 |
| 5,000,399 A * | 3/1991 | Readnour | .............. | B64D 33/02 244/130 |
| 5,058,617 A | 10/1991 | Stockman et al. | | |
| 5,156,362 A * | 10/1992 | Leon | ...................... | B64C 23/06 244/130 |

(Continued)

FOREIGN PATENT DOCUMENTS

| | | |
|---|---|---|
| EP | 1308387 A1 | 5/2003 |
| EP | 2148064 A2 | 1/2010 |
| GB | 1464971 A | 2/1977 |

OTHER PUBLICATIONS

Mar. 11, 2015 Search Report issued in British Patent Application No. GB1418322.2.

(Continued)

*Primary Examiner* — Igor Kershteyn
(74) *Attorney, Agent, or Firm* — Oliff PLC

(57) ABSTRACT

A nacelle for a turbofan gas turbine engine is provided. An inner wall of the nacelle defines an air intake which directs air into the fan section of the engine. The intake has, in flow series, an intake lip, a throat and a diffuser. The diffuser has, in flow series, first and second flow conditioning sections over both of which the flow cross-sectional area of the diffuser increases with increasing downstream distance from the throat. In addition, over the second section the nacelle inner wall lies substantially on a surface of an oblique circular cone having an apex which is offset from the centerline of the engine.

11 Claims, 4 Drawing Sheets

(56) References Cited

U.S. PATENT DOCUMENTS

| | | | |
|---|---|---|---|
| 5,915,403 A | 6/1999 | McConachie et al. | |
| 8,250,852 B2* | 8/2012 | Porte | F02C 7/141 |
| | | | 60/226.1 |
| 2003/0084936 A1 | 5/2003 | Surply et al. | |
| 2007/0176052 A1* | 8/2007 | Chanez | B64D 33/02 |
| | | | 244/53 B |
| 2009/0003997 A1* | 1/2009 | Jain | F04D 27/0253 |
| | | | 415/182.1 |
| 2010/0019100 A1* | 1/2010 | Smith | F02C 7/04 |
| | | | 244/53 B |
| 2010/0019101 A1* | 1/2010 | Smith | F02C 7/04 |
| | | | 244/53 B |
| 2010/0276007 A1 | 11/2010 | Hendricks | |

OTHER PUBLICATIONS

Mar. 7, 2016 Search Report issued in European Patent Application No. 15185622.

\* cited by examiner

GAS TURBINE ENGINE NACELLE

FIELD OF THE INVENTION

The present invention relates to a gas turbine engine nacelle.

BACKGROUND OF THE INVENTION

An intake for a turbofan gas turbine engine nacelle is required to supply the fan of the engine with appropriate quantities of favourably conditioned air with low pressure loss and distortion levels over the complete flight envelope. The nacelle intake may also be required to absorb noise generated by the gas turbine engine.

As shown in FIG. 1, the intake is formed by an inner wall of the nacelle and has, in flow series: a flared intake lip 1 designed to reduce off-design airflow separation by controlling the level of flow overspeeds, an intake throat 3, and a diffuser 5 to guide the airflow into the fan section. The diffuser also provides a settling length over which flow asymmetry is evened out.

The diffuser 5 typically ends at the engine face 7, which coincides with the upstream end of the fan case surrounding the fan section. On proceeding downstream, the air flow exiting the diffuser is thus bounded by structures, such as acoustic panels, which form an airwashed surface of the flow annulus formed within the fan case at the front of the fan section. In some engines such structures can be configured so that they further diffuse the incoming air to a position just upstream of the leading edges of the tips of the fan.

Older intake designs can have a conic diffuser with blend radii front and rear to connect to the lip and the airwashed surface at the front of the fan section. More recent intake designs can have diffusers constructed from CAD-generated splines which use the full diffuser length to progressively turn the airflow onto the engine axis.

At its downstream end, the diffuser 5 can be tangency matched to the, typically cylindrical, airwashed surface at the front of the fan section, for example using the approach described in EP A 2148064. Another option is to allow a degree of tangency mismatch (e.g. of up to 2°) which is constant around the circumference of this airwashed surface. In general, control of the diffuser curvature before this point is either made equal to one fan radius all around the circumference of the intake or is not directly controlled and subject to other intake design parameters.

To reduce nacelle drag, the overall nacelle size should be as small as possible. However, due to external cowl design considerations, this is generally achieved by having the lip region 1 offset vertically from engine centreline X-X and having the lip centre axis Y-Y and engine centerline angled to each other. This results in a three dimensional diffuser shape with higher levels of flow diffusion towards the bottom line than the top line.

In particular, the three dimensionality of the intake diffuser shape resulting from the lip region vertical offset, results in a non-uniform diffusion rate and hence can cause circumferential variation in airflow velocity delivered to the fan. This in turn can lead to a non-uniform aero loading on the fan blades as they rotate, changing the local inflow velocity and hence the local aerodynamic forces on the blade. This can produce a lower level of fan efficiency than desired, and higher stress on the fan blades which can reduce blade life. To compensate the fan outlet guide vanes (OGV's) located behind the fan can be cambered and staggered to counteract the intake flow asymmetry, but this increases complexity and cost. In addition configuring the OGV's to counteract intake flow asymmetry can reduce fan module aerodynamic efficiency.

High levels of flow asymmetry through the intake diffuser section can also adversely affect the level of attenuation to which acoustic liners in the intake can suppress fan buzz saw noise.

SUMMARY OF THE INVENTION

An object of the present invention is to reduce flow asymmetry in the diffuser in a way which is compatible with shorter intakes, for example, by moving the flow turning forward.

Accordingly, in a first aspect, the present invention provides a nacelle for a turbofan gas turbine engine, an inner wall of the nacelle defining an air intake which directs air into the fan section of the engine, the intake having, in flow series, an intake lip, a throat and a diffuser;

wherein the diffuser has, in flow series, first and second flow conditioning sections over both of which the flow cross-sectional area of the diffuser increases with increasing downstream distance from the throat, and over the second section the nacelle inner wall lying substantially on a surface of an oblique circular cone having an apex which is offset from the centreline of the engine.

By shaping the diffuser in this way, the airflow through the diffuser is obliged to re-bias itself as it moves through the second section such that disparities in flow velocity between the top and the bottom of the intake can be reduced. Advantageously, a diffuser having such a shape is also relatively easy to manufacture.

In a second aspect, the present invention provides a turbofan gas turbine engine including the nacelle of the first aspect.

Optional features of the invention will now be set out. These are applicable singly or in any combination with any aspect of the invention.

The apex of the oblique circular cone may be offset upwardly from the centreline of the engine. Such an arrangement is compatible with a positively scarfed intake in which the top of the lip of the intake extends further forward than the bottom of the lip producing a flow imbalance in which, on a given plane perpendicular to the engine axis, flow velocities are generally higher at the bottom of the diffuser than at the top. The upward offset can counteract this imbalance.

Another option, however, is for the apex of the oblique circular cone to be offset downwardly from the centreline of the engine, e.g. in combination with a negatively scarfed intake.

Yet another option is for the apex of the oblique circular cone to be offset to port or starboard of the centreline of the engine, e.g. in combination with a toed intake.

The second section may occupy at least 10% (and preferably at least 20%) of the length, as measured in the direction of the engine axis, of the diffuser profile which, on the longitudinal section containing the engine axis and the oblique circular cone axis, is on the other side of the engine axis from the apex of the oblique circular cone. The second section may occupy at most 50% (and preferably at most 35%) of the length, as measured in the direction of the engine axis, of this profile.

The second section may occupy at least 2% (and preferably at least 4%) of the length, as measured in the direction of the engine axis, of the diffuser profile which, on the longitudinal section containing the engine axis and the oblique circular cone axis, is on the same side of the engine axis as the apex of the oblique circular cone. The second section may occupy at most 25% (and preferably at most 10%) of the length, as measured in the direction of the engine axis, of this profile.

The second section of the diffuser can be followed immediately by the airwashed surface defining the flow annulus of the fan section. For example, the airwashed surface can be formed by a forward acoustic panel of the fan section, such a panel typically being mounted at an inner side of the fan case of the fan section. However, another option is for the diffuser to have a third flow conditioning section which, on longitudinal sections containing the engine axis, tangency matches the nacelle inner wall at the downstream end of the second section to an airwashed surface defining the flow annulus of the fan section. The third section, if present, is typically substantially shorter than the first and second sections.

The first and second sections may have an interface which lies on a plane whose normal is parallel to the engine axis or tilted from the engine axis. For example, the normal can be tilted upwardly, e.g. when the apex of the oblique circular cone is offset upwardly from the centreline of the engine, or the normal can be tilted downwardly, e.g. when the apex of the oblique circular cone is offset downwardly from the centreline of the engine. However, another option is for the first and second sections to have an interface which lies on a non-planar, i.e. curved, surface.

The diffuser profile which, on the longitudinal section containing the engine axis and the oblique circular cone axis, is on the same side of the engine axis as the apex of the oblique circular cone may make an angle to the engine axis which is in the range from 0° to +4°. The diffuser profile which, on the longitudinal section containing the engine axis and the oblique circular cone axis, is on the other side of the engine axis from the apex of the oblique circular cone may make an angle to the engine axis which is in the range from +2° to +10°. In both cases, a positive angle indicating a profile which expands radially outwardly with increasing downstream distance along the engine axis.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
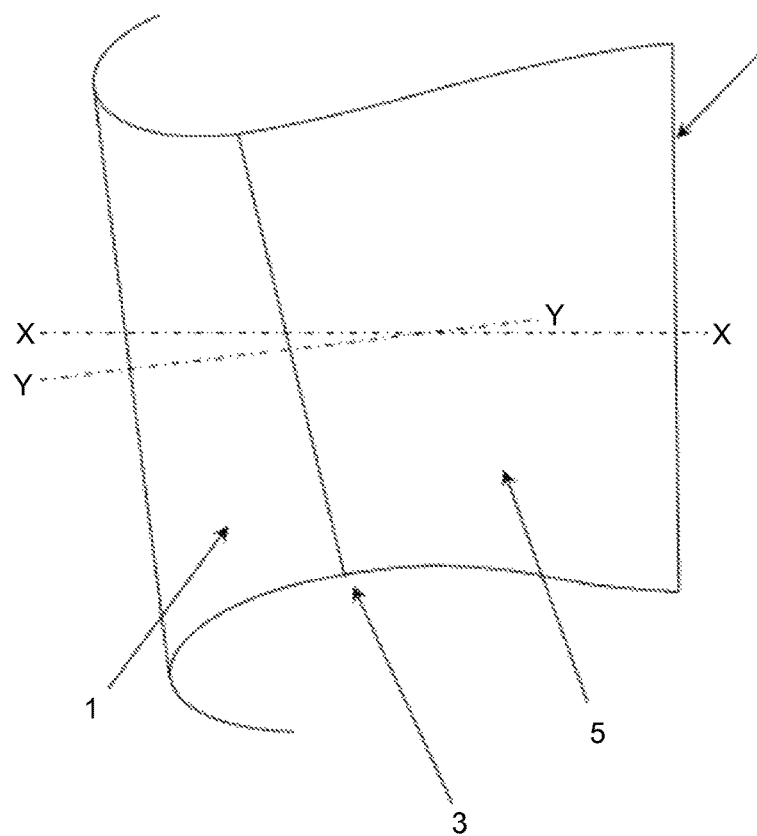
FIG. 1 shows an intake formed by an inner wall of a nacelle.
Figure 2:
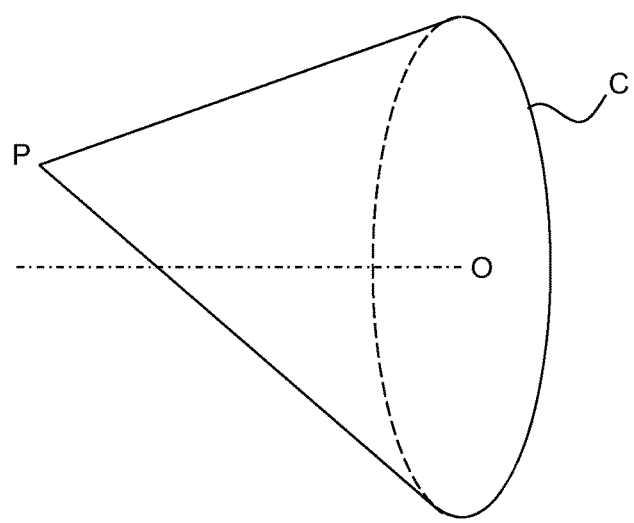
FIG. 2 shows an oblique circular cone.

In the present invention, the level of flow asymmetry in the airflow delivered to the fan can be reduced by the introduction at the rear of the intake diffuser of an oblique circular cone surface, i.e. a non-axisymmetric cone in which the apex point P is not located directly above the centre O of the base circle C as shown in FIG. 2. The oblique cone is oriented such that the base circle can become the interface at the engine face between the intake diffuser shape and the upstream end of the (typically cylindrical) airwashed surface which defines the flow annulus of the fan section.

As mentioned above, vertical offset of the intake lip region can result in the airflow velocities in the bottom of the intake being significantly higher than those at the top. However, introduction of the oblique cone surface in the rear of the diffuser obliges the bulk airflow to re-bias itself as it moves through this portion of the diffuser such that the disparity in velocities on the walls at the top and bottom of the intake can be reduced.

Figure 3:
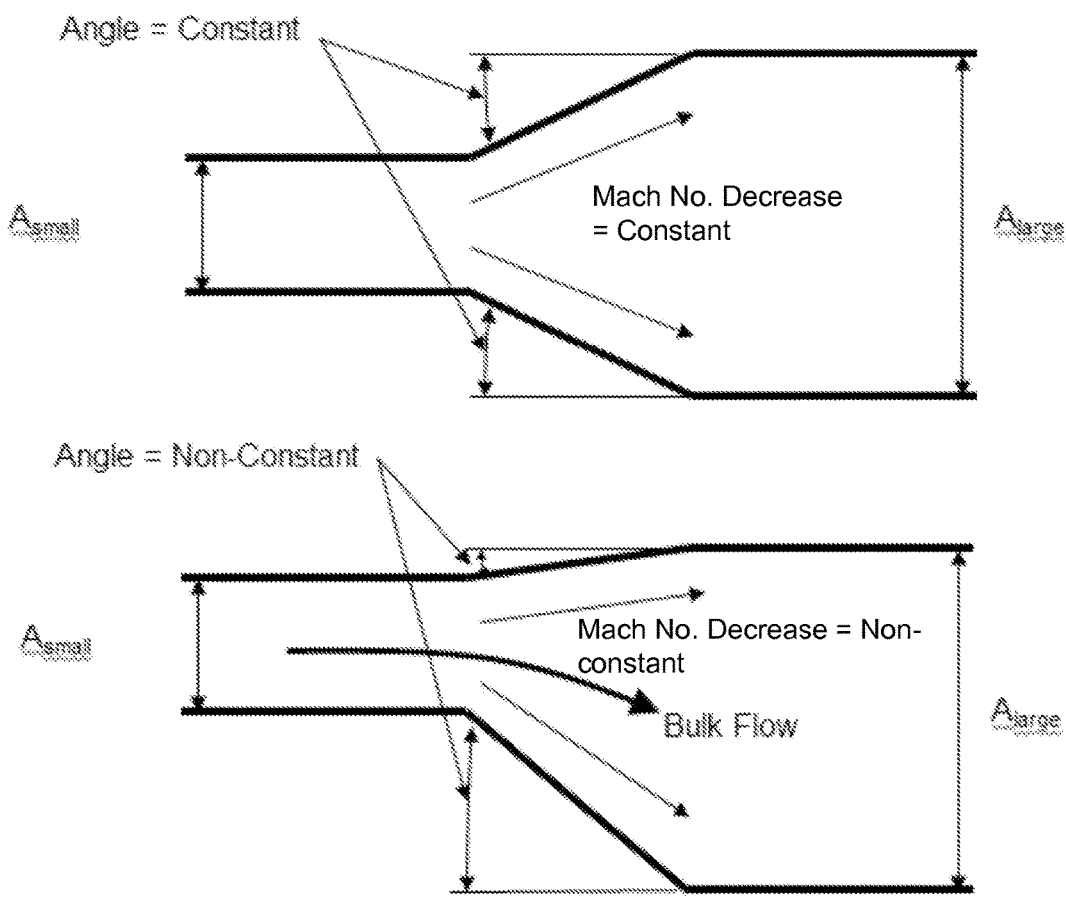
FIG. 3 shows schematically effects of introducing non-constant expansion angles around the circumference of a diffuser.

More particularly, a constant air flow moves at a high velocity through a duct with small area, and the same air flow will move at a low velocity through a duct with a large area. If the angle of expansion in the diffusing section is constant circumferentially, then the decrease in the speed of the airflow is also constant circumferentially. However if the angle of expansion varies, e.g. being smaller at the top than at the bottom, the airflow is forced to slow at a greater rate at the bottom than at the top, as the airflow at the bottom locally experiences an increase in flow area relative to that at the top. This is illustrated in the schematic drawings of FIG. 3.

Accordingly, incorporating a greater diffuser wall angle in the bottom of the intake than would be conventionally accepted has the positive effect of locally slowing the airflow velocity and reducing the magnitude of flow asymmetry. The airflow can be slowed even further locally as the diffuser shape transitions e.g. to a cylindrical section duct at the engine face, the flow experiencing a local underspeeding in the region of the transition. This double action reduction in airflow velocity can be positioned at the most beneficial location, such as just in front of the engine fan where it can significantly reduce the magnitude of flow non-uniformity that subsequently enters the fan.

Figure 4:
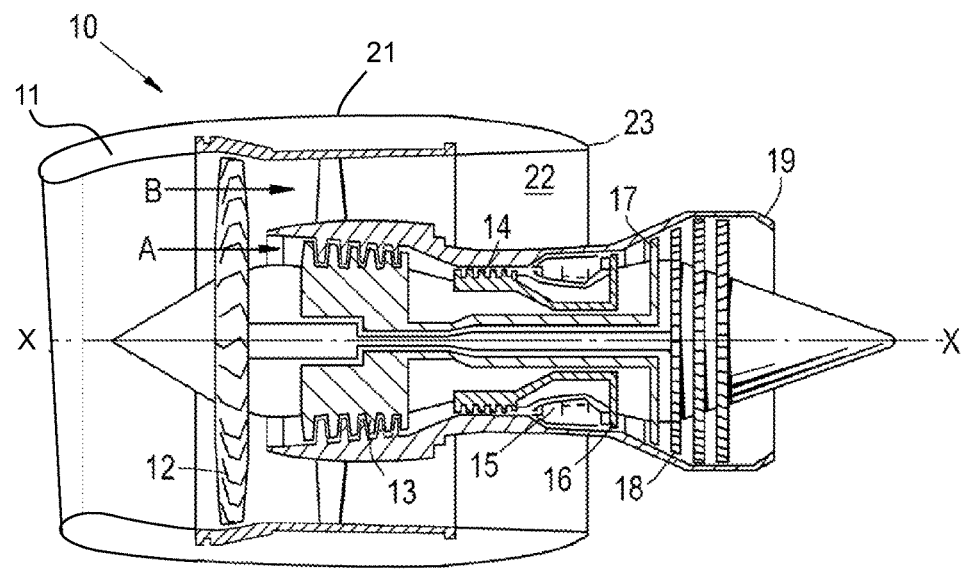
FIG. 4 shows a longitudinal cross-section through a ducted fan gas turbine engine.

With reference to FIG. 4, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 5:
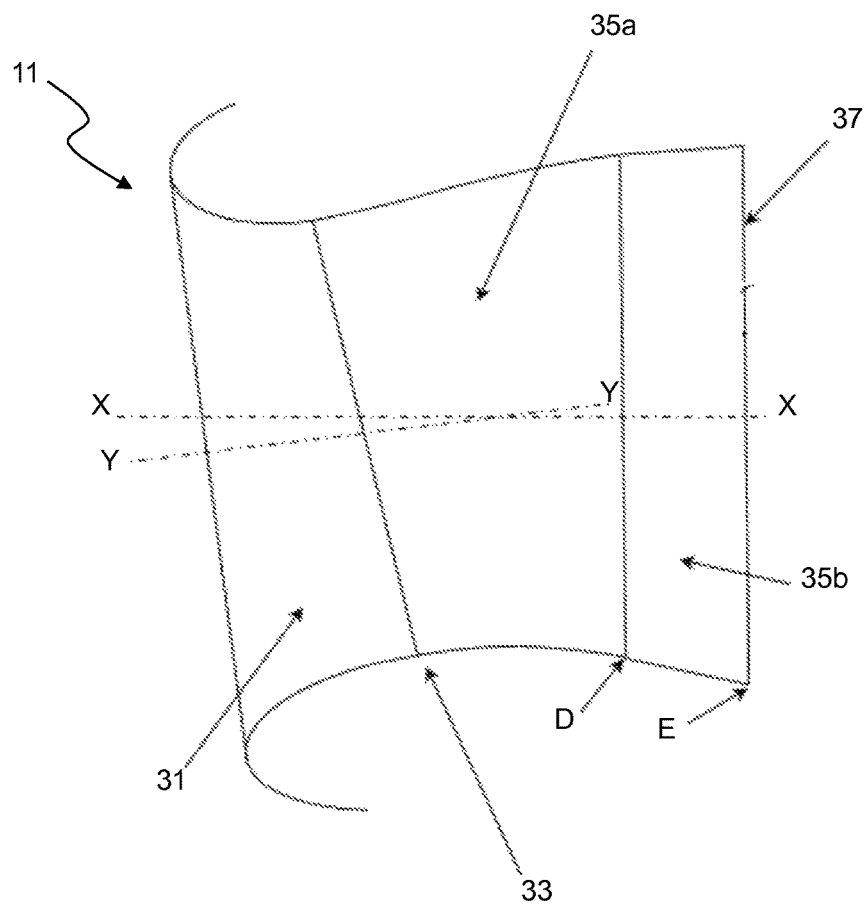
FIG. 5 shows in more detail the positively scarfed intake of the engine of FIG. 4.

FIG. 5 shows in more detail the positively scarfed intake 11 of FIG. 4. The intake 11 has a flared intake lip 31, an intake throat 33, and a diffuser which extends to the engine face 37. The diffuser further has a first 35a and second 35b flow conditioning sections. In both sections 35a, b the flow cross-sectional area of the diffuser increases with increasing downstream distance from the throat. Over the second section 35b the nacelle inner wall, which defines the intake, lies on a surface of an oblique circular cone having an apex which is offset vertically upwardly from the centreline of the engine. A tangency match is achieved at the interface D between the first 35a and second 35b sections. Optionally, a further tangency match can also be achieved at the interface E between the second 35b section and the airwashed surface which defines the flow annulus of the fan section. For example, the diffuser can be given a short, third flow conditioning section to tangency match the nacelle inner wall at the downstream end of the second section 35b to the airwashed surface. This can be achieved using the approach described in EP A 2148064, which is hereby incorporated by reference.

At the bottom of the intake on a longitudinal section through the intake, the oblique circular cone produces an angle for the profile of the second section 35b to the engine axis X-X between interfaces D and E which can typically be in the range from +2° to +10°. In contrast, at the top of the intake on the same longitudinal section, the angle of the profile of the second section 35b between interfaces D and E is smaller and can typically be in the range from 0° to +4°.

There are various ways in which the shape of the second section 35b can be adjusted to assist in achieving a desirably low level of flow asymmetry in the airflow delivered to the engine fan.

For example, the longitudinal section profile angle in the second section 35b produced by the oblique cone has a constant rate of change with vertical distance about the intake circumference between the top of the intake and the bottom. However, the rate of change of the profile angle can be adjusted if necessary. In such a case, over the second section 35b the nacelle inner wall still lies substantially on the surface of the oblique cone, but the adjustment can provide an improved airflow.

Figure 6:
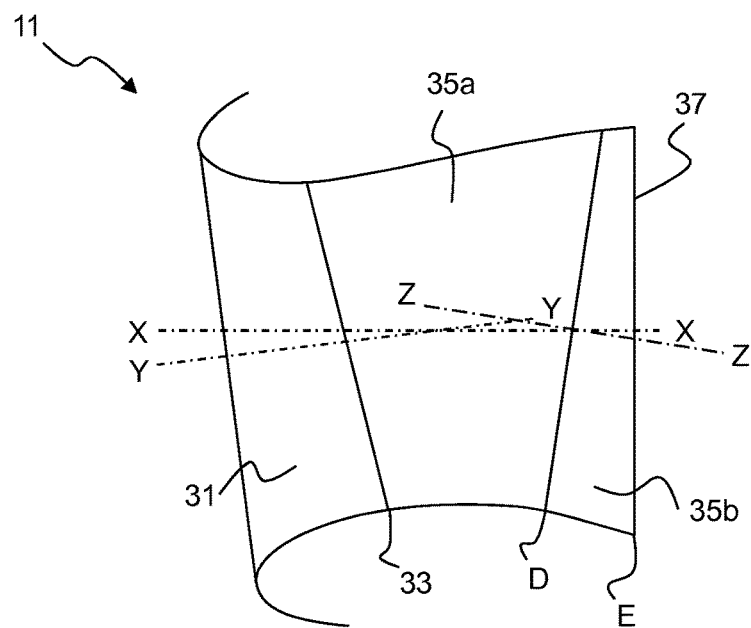
FIG. 6 shows a variant of the intake of FIG. 5.
Figure 7:
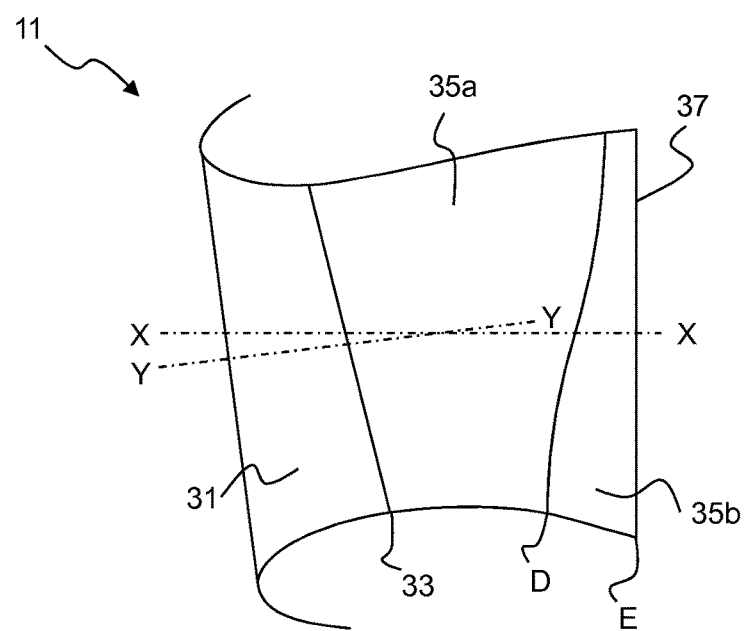
FIG. 7 shows another variant of the intake of FIG. 5.

In FIG. 5, interface D is parallel to the engine face 37. However, the angle of interface D can be tilted such that a normal Z-Z to the plane of the interface is tilted from the engine axis X-X, as shown in FIG. 6. Varying the angle between the plane of interface D and the engine face 37 can be used to improve the turning of the bulk airflow. Indeed, as shown in FIG. 7, another option is to change the distance parallel to the engine axis between interface D and the engine face 37 so that it does not change linearly with vertical distance about the intake circumference between the top of the intake and the bottom (as in FIG. 6). The result is a smoothly continuous, but non-planar interface D between the first 35a and second 35b sections of the diffuser.

Thus bearing in mind that the interface D can be tilted and may be non-planar, at the bottom of the intake, the distance measured in the axial direction from interface E to interface D may be from 10 to 50% of the axial distance from interface E to the throat 33. Similarly, at the top of the intake, the axial distance from interface E to interface D may be from 2 to 25% of the axial distance from interface E to the throat 33.

By adopting an intake having a diffuser with walls which, at its rear end, lie on a surface oblique cone, the magnitude of non-uniformity in the airflow delivered, through the intake, to the fan can be significantly reduced. In particular, by introducing local diffuser wall angles larger than conventionally accepted, specifically in the bottom of the intake where the airflow is moving fastest, can initiate a local slowing of the airflow at the fan face that is powerful enough to reduce non-uniformities in the airflow delivered to the fan. For example, reduction in engine face circumferential Mach number variation (the difference in Mach number between the highest and lowest Mach numbers on the plane of the engine face) of up to 80% can be achieved by adopting an intake according to the present invention. This can provide significant improvements in fan efficiency, fan life and noise levels.

The present invention can also help to reduce fan airflow distortion over a range of off-design conditions, particularly in high crosswind on engine side line and high incidence (close to stall) conditions where intake/fan interaction effects can become significant.

While the invention has been described in conjunction with the exemplary embodiments described above, many equivalent modifications and variations will be apparent to those skilled in the art when given this disclosure. For example, although described above in relation to a positively scarfed intake, the present invention can also be applied to a negatively scarfed intake. In such a situation, the apex of the oblique circular cone can be offset vertically downwardly from the centreline of the engine in order to counteract an airflow asymmetry which has higher Mach numbers at the top than at the bottom of the diffuser. Another option is for the intake to be toed, in which case the apex of the oblique circular cone can be offset to port or starboard of the engine centreline. Accordingly, the exemplary embodiments of the invention set forth above are considered to be illustrative and not limiting. Various changes to the described embodiments may be made without departing from the spirit and scope of the invention.

The invention claimed is:

1. A nacelle for a turbofan gas turbine engine, an inner wall of the nacelle defining an air intake which directs air into the fan section of the engine, the intake having, in flow series, an intake lip, a throat and a diffuser;
    wherein the diffuser has, in flow series, first and second flow conditioning sections over both of which the flow cross-sectional area of the diffuser increases with increasing downstream distance from the throat, and over the second section the nacelle inner wall lying substantially on a surface of an oblique circular cone having an apex which is offset from the centreline of the engine, wherein the second section occupies at least 10% and at most 50% of the length, as measured in the direction of the engine axis, of the diffuser profile which, on the longitudinal section containing the engine axis and the oblique circular cone axis, is on the other side of the engine axis from the apex of the oblique circular cone.

2. A nacelle according to claim 1, wherein the diffuser has a third flow conditioning section which, on longitudinal sections containing the engine axis, tangency matches the nacelle inner wall at the downstream end of the second section to an airwashed surface defining the flow annulus of the fan section.

3. A nacelle according to claim 1, wherein the second section occupies at least 2% and at most 25% of the length, as measured in the direction of the engine axis, of the diffuser profile which, on the longitudinal section containing the engine axis and the oblique circular cone axis, is on the same side of the engine axis as the apex of the oblique circular cone.

4. A nacelle according to claim 1, wherein the first and second sections have an interface which lies on a plane whose normal is parallel to the engine axis.

5. A nacelle according claim 1, wherein the first and second sections have an interface which lies on a plane whose normal is tilted from the engine axis.

6. A nacelle according to claim 1, wherein the first and second sections have an interface which lies on a non-planar surface.

7. A nacelle according to claim 1, wherein the diffuser profile which, on the longitudinal section containing the engine axis and the oblique circular cone axis, is on the same side of the engine axis as the apex of the oblique circular cone makes an angle to the engine axis which is in the range from 0° to +4°, a positive angle indicating a profile which expands radially outwardly with increasing downstream distance along the engine axis.

8. A nacelle according to claim 1, wherein the diffuser profile which, on the longitudinal section containing the engine axis and the oblique circular cone axis, is on the other side of the engine axis from the apex of the oblique circular cone makes an angle to the engine axis which is in the range from +2° to +10°, a positive angle indicating a profile which expands radially outwardly with increasing downstream distance along the engine axis.

9. A turbofan gas turbine engine including the nacelle of claim 1.

10. A nacelle for a turbofan gas turbine engine, an inner wall of the nacelle defining an air intake which directs air into the fan section of the engine, the intake having, in flow series, an intake lip, a throat and a diffuser;
wherein the diffuser has, in flow series, first and second flow conditioning sections over both of which the flow cross-sectional area of the diffuser increases with increasing downstream distance from the throat, and over the second section the nacelle inner wall lying substantially on a surface of an oblique circular cone having an apex which is offset from the centreline of the engine, wherein the first and second sections have an interface which lies on a plane whose normal is tilted from the engine axis.

11. A nacelle for a turbofan gas turbine engine, an inner wall of the nacelle defining an air intake which directs air into the fan section of the engine, the intake having, in flow series, an intake lip, a throat and a diffuser;
wherein the diffuser has, in flow series, first and second flow conditioning sections over both of which the flow cross-sectional area of the diffuser increases with increasing downstream distance from the throat, and over the second section the nacelle inner wall lying substantially on a surface of an oblique circular cone having an apex which is offset from the centreline of the engine, wherein the first and second sections have an interface which lies on a non-planar surface.

* * * * *